United States Patent [19]
Yue

[11] Patent Number: 5,129,043
[45] Date of Patent: Jul. 7, 1992

[54] PERFORMANCE IMPROVEMENT TOOL FOR RULE BASED EXPERT SYSTEMS

[75] Inventor: Po C. Yue, Ossining, N.Y.

[73] Assignee: International Business Machines Corporation, Armonk, N.Y.

[21] Appl. No.: 393,526

[22] Filed: Aug. 14, 1989

[51] Int. Cl.$^5$ .............................................. G06F 15/16
[52] U.S. Cl. ...................................... 395/51; 364/478
[58] Field of Search .................. 395/51; 364/478, 200, 364/471, 184, 507

[56] References Cited

U.S. PATENT DOCUMENTS

| 4,649,515 | 3/1987 | Thompson et al. | 364/184 |
| 4,658,370 | 4/1987 | Erman et al. | |
| 4,704,695 | 11/1987 | Kimura et al. | |
| 4,837,735 | 6/1989 | Allen, Jr. et al. | 364/200 |
| 4,864,511 | 9/1989 | Moy et al. | 364/478 |
| 4,907,973 | 3/1990 | Hon | 434/307 |
| 4,953,147 | 8/1990 | Cobb | 364/507 |
| 4,984,773 | 1/1991 | Balban et al. | 364/471 |

OTHER PUBLICATIONS

Programming Expert Systems in OPS5, Lee Brownston, et al, Addison-Wesley Publishing Company, Inc., Copyright 1985, pp. 225-272.

Rule-Based Programming with OPS5, Thomas Cooper, et al, Morgan Kaufmann Publishers, Inc., Copyright 1988, pp. 199-229.

Primary Examiner—Allen R. MacDonald
Assistant Examiner—George Davis
Attorney, Agent, or Firm—Andrew J. Dillion

[57] ABSTRACT

A monitoring system monitors an expert system application while such application executes for a period of time. The monitoring system records selected performance data relative to the operating efficiency of the expert system, and writes such data into a database for later use. After a test run of the expert system is completed, the monitoring system can select a small number of candidate rules for revision by a user, and display data to the user which allows the user to determine what types of changes need to be made to the candidate rules and to the working memory data organization.

10 Claims, 5 Drawing Sheets

PERFORMANCE IMPROVEMENT TOOL FOR RULE BASED EXPERT SYSTEMS

BACKGROUND OF THE INVENTION

1. Technical Field

The present invention relates generally to computer systems, and more specifically to performance monitoring and enhancement tools for use with rule based expert systems.

2. Background Art

Expert systems are computer programs, often run on general purpose computers, which attempt to capture the knowledge of experts in a field. This captured knowledge can then be used by non-experts who, by entering observable data, are able to receive one or more hypotheses as to the cause of abnormal observations or to receive advice in complex decisions. Expert systems typically incorporate data, including facts and relationships, and rules. The databases used by expert systems are often referred to as knowledge bases.

When executing, expert systems use large amounts of CPU resources. Integrating expert system technology into mainstream data processing environments requires significant effort in performance tuning in order to compete on a performance basis with more conventional procedural approaches using third generation programming languages.

The most popular type of expert systems are referred to as production systems. Users write rules consisting of a left-hand-side (LHS) and a right-hand-side (RHS). When the LHS conditions of a rule are met, that rule is fired and the RHS is executed. The RHS changes the state of a working memory which contains all the elements of facts and data used by the expert system. After a rule is fired, the LHS of the rules must again be matched with the new state of working memory.

Figure 1:
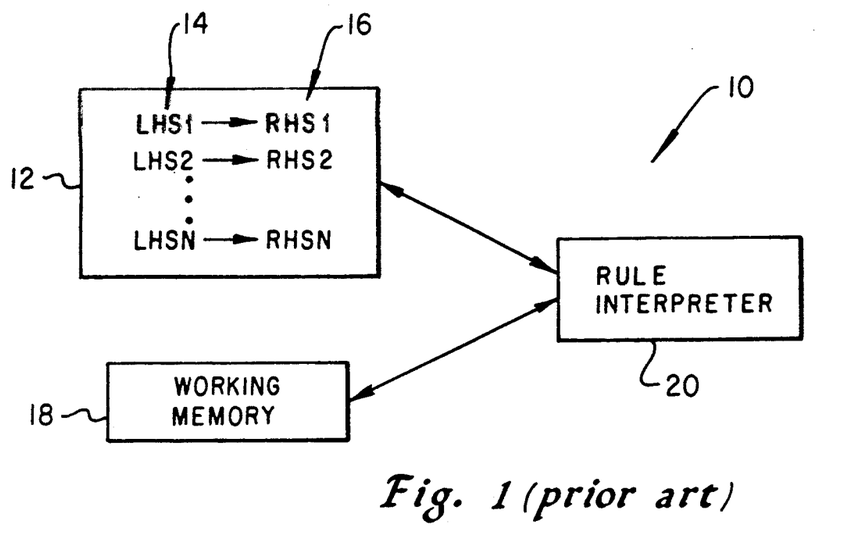
FIG. 1 is a block diagram of a production system.

FIG. 1 shows a high level block diagram of a production system 10. The production system 10 includes a set of rules 12, each having a left-hand-side 14 and a right-hand-side 16. The production system 10 also includes a working memory 18 which contains the facts "known" by the production system 10. A rule interpreter 20, also referred to as an inference engine, matches rule left-hand-sides 14 with working memory 18, and executes right-hand-sides 16.

Figure 2:
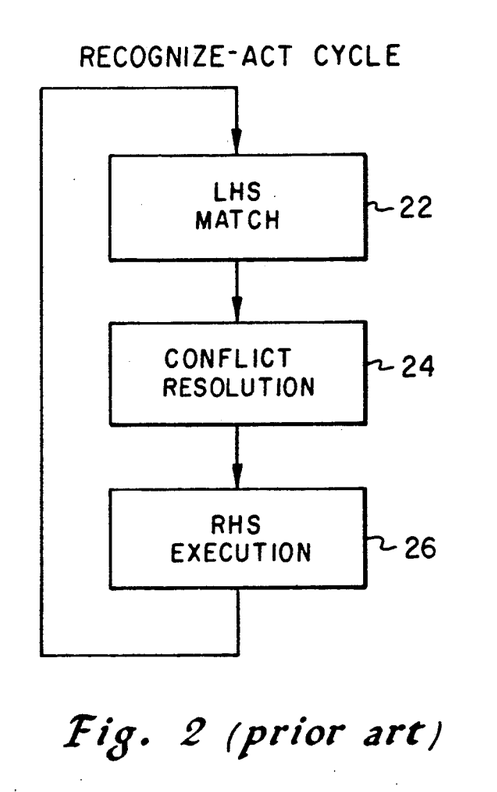
FIG. 2 is a flowchart illustrating the recognize-act cycle.

The rule interpreter 20 operates in an endless loop known as a recognize-act cycle. The recognize-act cycle is shown in FIG. 2. The rule interpreter first performs a match of all rule left-hand-sides with working memory 22. More than one rule may generate a match each against its own set of relevant facts, but only one rule at a time may be fired to handle one of the facts. The rule interpreter 20 selects the rule to be fired, and the fact, using conflict resolution. Conflict resolution algorithms typically select the highest priority rule and the most current fact for firing. Once one of the rules is selected, the corresponding right-hand-side is executed 26, causing a change in working memory. The cycle then repeats, with all of the rule left-hand-sides again being matched to the updated working memory 22.

The art of writing efficient rules programs has not yet been fully developed. General guidelines for efficient rule construction can be found in RULE-BASED PROGRAMMING WITH OPS5, by Thomas Cooper and Nancy Wogrin, Morgan Kaufmann Publishers, Inc., San Mateo, Calif., 1988, and PROGRAMMING EXPERT SYSTEMS IN OPS5, Lee Brownston et al, Addison-Wesley Publishing Company Inc., Reading, Mass., 1985. Other than these two references, there are no sources of expertise available to expert system builders regarding performance tuning of their programs.

The guidelines in the references cited above are rules-of-thumb which are to be applied by the expert systems programmer based on his experience. These rules of thumb are based on a knowledge of the method in which the rule interpreter works. Rule interpreters in available production systems are optimized for efficiency, so that, in general, when a rule RHS is fired, only those LHS's which are directly affected by the changes to working memory are matched on the following match cycle. The rule interpreters limit matching by use of the Rete algorithm, which involves the creation of numerous data structures to store results of matches so that they need not be made again if the relevant working memory elements have not changed. When one or more working memory elements change, the Rete data structure is examined by the rule interpreter to determine which portions of which rules are affected, and performs a match only on those rules.

Because of the nature of the Rete algorithm, large inefficiencies can sometimes be caused in a rules program by small portions of rule left-hand-sides due to the interactions between rules and between rules and data. This is due to large numbers of relevant working memory elements being screened or compared with each other in various combinations. The screening is done by intraelement tests and the comparison by interelement tests. The test specifications are referred to as patterns. The manner in which rules and working memory are structured can make a dramatic difference in the time needed to perform pattern matching.

The rules-of-thumb used by expert system programmers to improve efficiency of a program are general in nature, and not always easily applied. Typical examples of such guidelines are: avoid conditions that match many working memory elements; avoid large cross-products between conditions; avoid frequent changes to matched conditions; make matching individual condition elements faster; and limit the size of the conflict set. Typical solutions for some of these problems include reordering conditions on the left-hand-side so that more restrictive ones occur first and conditions that match frequently changing working memory elements occur last. Expert system programmers must often make intuitive guesses as to where changes should be made, since adequate tools for monitoring and evaluating the performance of rule based expert systems do not currently exist.

Expert system performance is extremely data sensitive. It is rarely possible to evaluate the efficiency of a rules program simply by examining the rules themselves. When a rule is fired, many other rules are involved depending on the current state of the system, the amount of data in working memory, and the firing history of previous rules. The work that needs to be done in pattern matching is not easily predictable in advance. Therefore, there is no universal rule for writing efficient rules in expert system applications.

The benefit of rules programming lies in moving most of the data processing into the LHS, which is compact and declarative. In other words, rule LHS's specify properties of the data without specifying the mechanics of evaluation. Writing rule based applications is simple relative to procedural language approaches, but nonoptimized programs can sometimes be very inefficient. Therefore, the cost of optimizing, or tuning, a rules based program must be balanced with the productivity gain of writing a rules program for a complex application. An effective tuning facility that economizes the tuning effort is essential.

It would therefore be desirable to provide a system for collecting data useful to help pinpoint which rules cause the greatest inefficiency during execution of a rules program. It would also be desirable for such a system to assist a user in analyzing his application performance and pinpointing the causes of inefficiencies.

SUMMARY OF THE INVENTION

It is therefore an object of the present invention to provide a system for monitoring those parts of a rule based expert system which provide data useful in determining program execution inefficiencies.

It is another object of the present invention to provide such a system which represents usable data in a comprehensible format to a user interested in making performance enhancements to an application.

It is a further object of the present invention to provide such a system which will automatically select inefficient portions of an expert system application, and present a selected few candidates to the user for making performance related changes to the application.

Therefore, according to the present invention, a monitoring system monitors an expert system application while such application executes for a period of time. The monitoring system records selected performance data relative to the operating efficiency of the expert system, and writes such data into a database for later use. After a test run of the expert system is completed, the monitoring system can select a small number of candidate rules for revision by a user, and display data to the user which allows the user to determine what types of changes need to be made to the candidate rules.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

The monitoring system described herein is appropriate for use with a rule interpreter 20 which uses the Rete matching algorithm. Examples of production system for which this invention would be suitable include OPS5, available from Digital Equipment Corp., and Knowledge Tool, available from International Business Machines.

Figure 3:
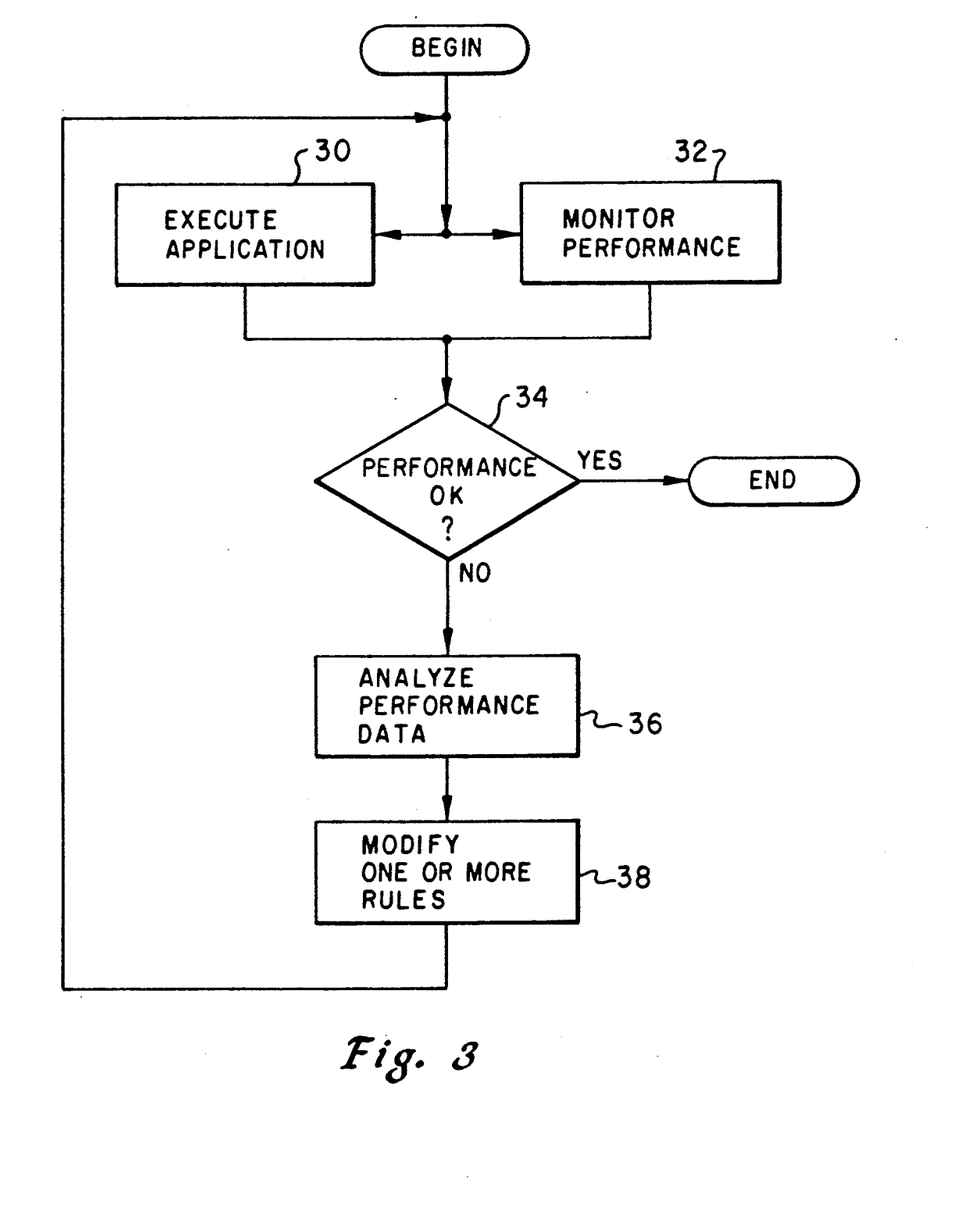
FIG. 3 is a flowchart illustrating the tuning process as applied to an expert system.

Referring to FIG. 3, a procedure used for tuning the performance of an expert system application is shown. First, the expert system application is executed 30, and its performance monitored 32 as will be described in more detail below. A user interested in the performance of the application determines whether the performance is satisfactory 34. If so, the procedure is complete. If not, the performance data taken during step 32 is analyzed 36, and one or more rules in the application are modified 38. Step 38 may also include modification of how facts and data are organized in order to change it to a representation which is more efficient with the application being examined. Once the modifications have been made, the application is again executed and the procedure repeats.

Figure 4:
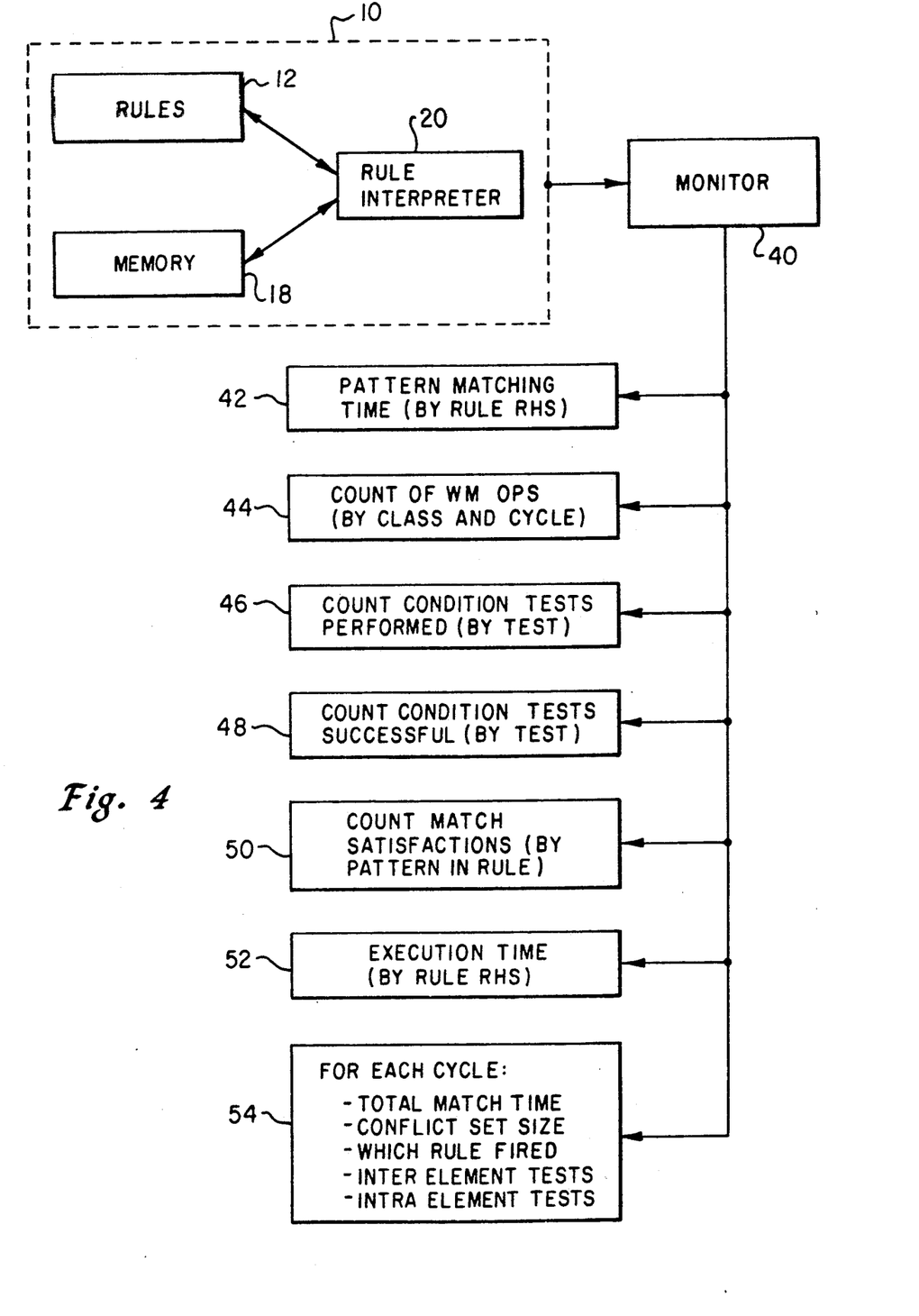
FIG. 4 is a block diagram of a monitoring system illustrating the data collected during execution of an expert system program.

Referring to FIG. 4, a monitor program 40 executes during execution of the production system 10, and generates various types of data 42-54 for storage in a database. This data will be retrieved at a later time as described below for use in analyzing performance inefficiencies of the production system 10.

Techniques for actually monitoring performance of an executing program are known in the art. These techniques can easily be adapted to form the monitor 40 once the information to be monitored has been determined. In performance monitoring systems, selection of the data to be monitored is generally considered to be a more important and creative task than writing the computer code which actually performs the monitoring.

The first set of data 42 to be collected by the monitor 40 is the pattern matching time. This time is preferably defined to be the time consumed by the rule interpreter 20 in performing the left-hand-side match 22 and conflict resolution 24 steps which occur after an RHS firing. The pattern matching time data 42 is kept on a cumulative, individual basis for each rule. Thus, at the end of a run of the expert system, the collected data set 42 contains, for each rule RHS, the total amount of time spent pattern matching and resolving conflicts as a result of changes made to working memory when that RHS fired.

The second collected data set 44 contains a cumulative count of all working memory operations caused by RHS execution. Such count is preferably kept separately for each class of element in working memory, and is kept on a cycle by cycle basis. Allocations, deletes, and updates of working memory elements are tabulated separately. Thus, at the end of a test run, the collected data set 44 contains, for each recognize-act cycle, an entry for each class affected by the previously fired RHS. Each entry contains a tabulation of the total number of allocations, deletes, and updates performed to members of that class during that cycle.

The third data set 46 collected by the monitor 40 is a count of the number of times each condition test on a rule LHS was logically required to be performed. For every condition test which must be performed as a result of an RHS firing, a counter for that rule is incremented. At the end of a test run, each condition test has a counter which indicates the total number of times that it was performed.

The monitor 40 also collects a count of successful condition tests 48. A second counter is provided for each condition test, and this counter is incremented for some condition test only when that condition test is successful.

The next data set 50 collected by the monitor 40 is a count of the number of pattern match satisfactions. Each pattern is kept track of separately. The count of match satisfactions is a count of the number of working memory element combinations which satisfy that pattern, and is obtained from scanning the Rete data structure. Preferably, only the maximum number of satisfactions ever encountered for the pattern is retained. Therefore, each time a pattern is matched, the number of working memory element combinations which satisfy that pattern is obtained from the Rete data structure and compared with the previous maximum value for that pattern. Only the higher value is retained.

The next data set 52 collected by the monitor 40 is the execution time of rule RHSs. This is a cumulative total kept for each rule, so that at the end of a run the total amount of time actually spent executing the right-hand-side of a rule is available for each rule.

The last data set 54 collected by the monitor 40 contains an entry for each recognize-act cycle performed by the expert system. Each entry contains the total match time for that cycle, preferably including the conflict resolution time as described above. The conflict set size and the identity of which rule fired to initiate that cycle are included in each entry. The conflict set size is a count of the relevant working memory element combinations associated with all the rules that are eligible for firing. Also included are the number of interelement condition tests and intraelement condition tests performed during that cycle. This information accounts for the tests actually performed, whereas the counts collected in data sets 46 and 48 account for the tests logically required for each pattern. The actual test counts are lower because any condition test that is common across different rules is performed only once but the result is shared. The difference indicates the extent to which the sharing is utilized.

The data collected by the monitor 40 is written into a database for later use. Preferably, each data set retains its identity in the database. The format for storage in the database is not important. For ease of use, the collected information can be stored in text files having the same format as the reports described in connection with FIG. 5.

Figure 5:
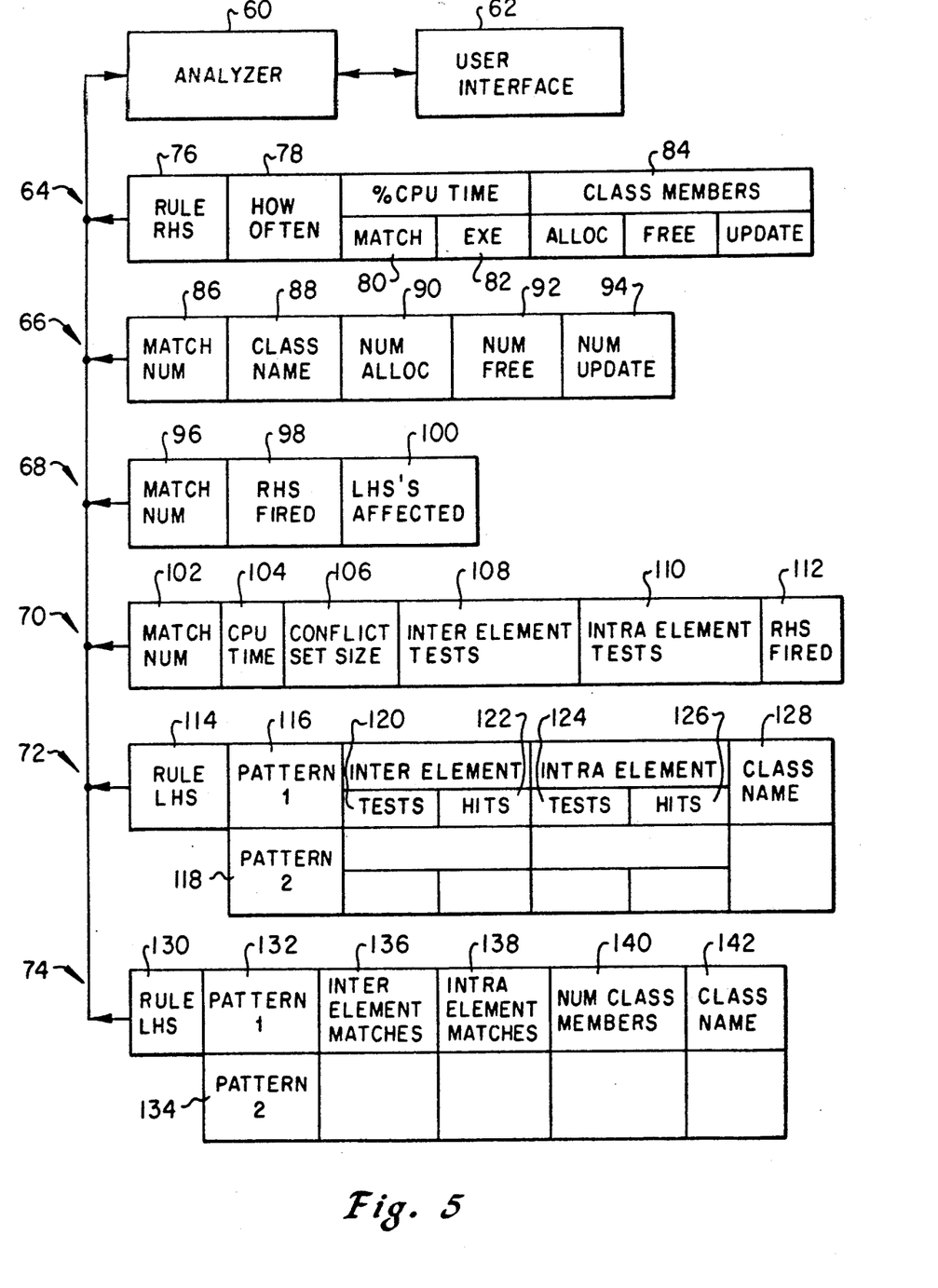
FIG. 5 is a block diagram illustrating the use of collected data by an analyzer.

Referring to FIG. 5, an analyzer 60 is connected to a user interface 62. The analyzer 60 is preferably a program which runs on a general purpose computer system, and accesses the database created by the monitor 40 as described in connection with FIG. 4. The analyzer 60 extracts data from the database and presents it to the user interface 62 in the format of several different reports 64-74.

Report 64 includes one entry for the right-hand-side of each rule 76. The information in the entry includes a count of the number of times that RHS was fired 78, and a calculation of the percentage of the total CPU time for the run which was spent in pattern matching following rule firings for that RHS 80 and time spent in actually executing that rule RHS 82. Also included is an activity count 84 for all of the class members affected by firings of that rule. The activity counts are separately tabulated as to the number of class members allocated, freed, and updated. All of the counts and calculations 78-84 are cumulative over the entire monitoring period.

Report 66 indicates the class member activity subdivided both by match number 86, (recognize-act cycle number) and class name 88. In other words, for each recognize act cycle, there is a separate entry in report 66 which indicates the number of the cycle and the class which had at least one member which changed. Thus, for example, if members of three different classes were changed as a result of a single RHS firing, there would be three entries in report 66 for that cycle. Each entry contains a count of the number of working memory elements which were allocated 90, freed 92, and updated 94 during that cycle for that class.

Report 68 contains a plurality of entries, with each entry containing a match, or cycle, number 96, the identity of which RHS fired to initiate that cycle 98, and an identification of a rule left-hand-side which must be rematched as a result of the most recent firing 100. Preferably, each entry contains one LHS affected 100, so that if five rules must be rematched as a result of one RHS firing, report 68 will contain five entries having identical match numbers 96 and RHS fired 98 entries.

Report 70 contains one entry for each cycle. Each entry contains the match number for that cycle 102, the total CPU time to perform the match and conflict resolution 104, and the conflict set size 106. Also included are the number of interelement tests 108 and intraelement tests 110 which were performed. The RHS which fired just before the cycle began is also included 112.

Report 72 contains one entry for each rule in the expert system, which is identified by the rule LHS 114. Each entry contains one subentry corresponding to each of the patterns contained within the left-hand-side of that rule. Two pattern subentries 116, 118 are shown in FIG. 5, but the precise number of pattern subentries for each rule LHS 114 depends on the number of patterns contained within each rule.

Each subentry contains the number of interelement condition tests which were required 120 for matching that rule LHS, and the number which were successful 122. Each subentry also contains the number of intraelement condition tests which were required 124, and the number which were successful 126. The class name 128 corresponding to each pattern is also included in the appropriate subentry.

Report 74 also contains one entry for each rule left-hand-side. Each entry identifies the rule LHS 130, and contains a subentry for each pattern within the rule in a manner similar to that of report 72. FIG. 5 shows only a first pattern subentry 32 and a second pattern subentry 134, but the number will vary as described above. Each subentry contains a number indicating the maximum number of interelement match satisfactions 136 which ever existed, and the maximum number of intraelement matches 138 for that pattern. These are the numbers obtained in collected data set 50 of FIG. 4. Each subentry also includes the total number of class members for a class 140, and the name of the class 142.

It is easily seen that the reports 64-74 are generated directly from the data sets 42-54 collected by the monitor 40. For example, report 70 is simply a listing of data set 54. Rule 74 is derived from data set 50. Other reports are similarly derived from the data sets 42-54.

Figure 6:
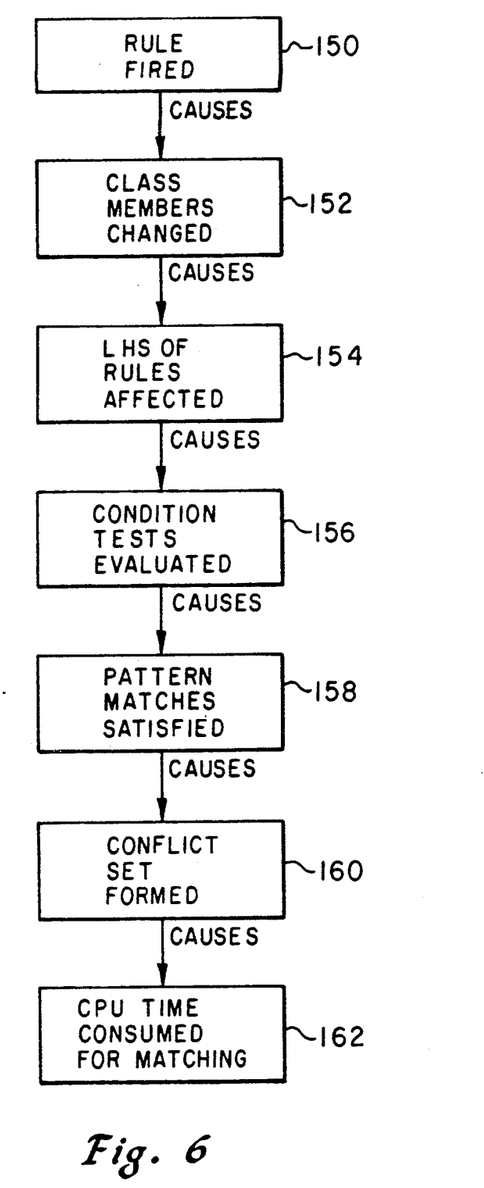
FIG. 6 is a diagram illustrating cause and effect relationships between different portions of an executing expert system.

The various reports 64-74 generated by the analyzer 60 are defined and displayed according to the philosophy expressed in the cause/effect chain shown in FIG. 6. FIG. 6 illustrates the relationships between different parts of the interaction between the rules 12 working memory 18 and rule interpreter 20 that can lead to inefficiency. The selection and layout of the collected data displayed in the reports of FIG. 5 is preferably made so as to emphasize and describe the nature of these relationships.

FIG. 6 describes the interrelationship of events which occurs during each recognize-act cycle. The right-hand-side of a rule is fired 150, causing some number of class members to be changed 152. A change in some class members 152 causes the left-hand-side of certain rules to be affected 154. As is known to those familiar with the Rete algorithm, only those rules having left-hand-sides affected by the changed class members 152 are rematched.

Rematching of the affected rules 154 causes the condition tests within those rules to be reevaluated 156. This, in turn, potentially causes some number of pattern matches to be satisfied 158. Satisfaction of the appropriate patterns within the affected rules adds these rules and their matched working memory elements to, or subtracts them from, the conflict set 160. This formation of the conflict set 160, by testing conditions and matching patterns, is what consumes CPU time 162 during execution of the expert system program.

Analyzing execution of the expert system application in accordance with the concepts shown in FIG. 6 results in an attempt to improve efficiency by focusing attention on those rules which, when their right-hand-sides fire, cause the rule interpreter 20 to use inordinate amounts of CPU time in the following match cycle. The rules which fire and generate this extensive matching can be referred to as culprit rules.

Box 154 indicates that, as a result of a culprit rule firing, the LHS of some rules must be rematched. The matching of these rules is what actually uses the large amounts of CPU time. Therefore, these rules can be referred to as suspect rules, and analysis of performance information should be focused on them.

Figure 7:
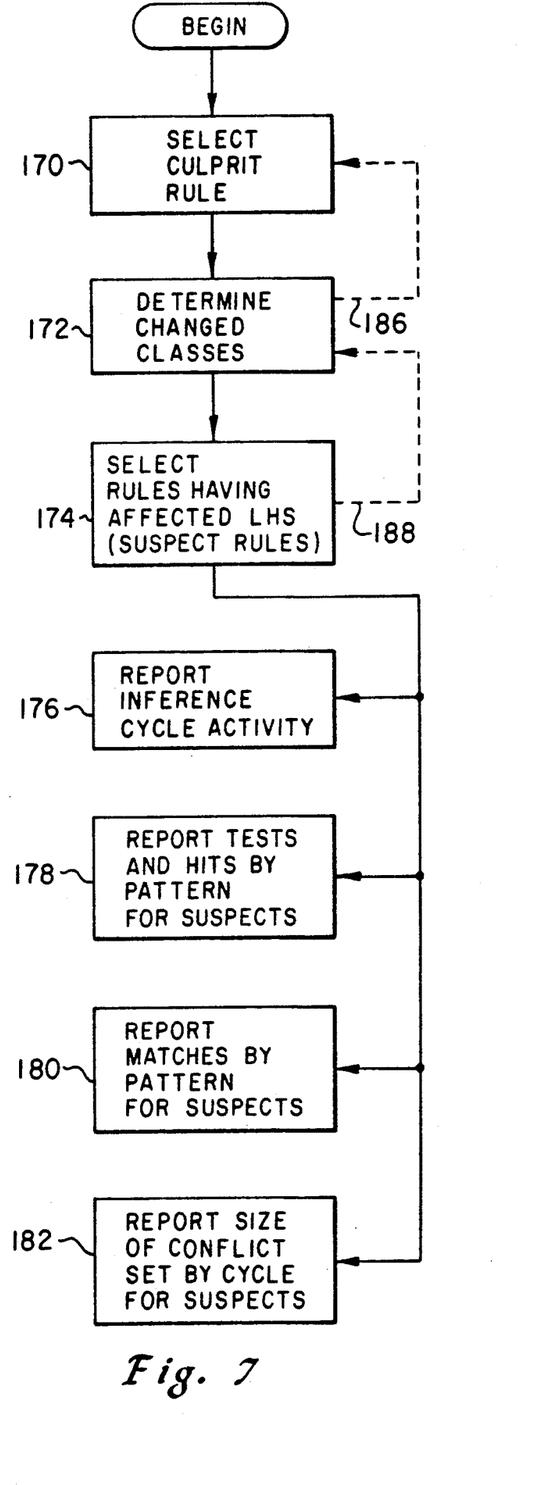
FIG. 7 is a flowchart illustrating operation of the analyzer of FIG. 5.

Referring to FIG. 7, operation of the analyzer 60 is shown. When operation of the analyzer 60 begins, the first step is to select a culprit rule 170. If desired, several culprit rules may be selected and followed simultaneously, but the description of FIG. 7 will assume that only one culprit rule is selected at a time.

The culprit rule is selected 170 based on the information shown in report 64. The culprit rule is preferably the rule which causes the highest percent of CPU time spent matching 80.

The next step is to determine which classes were changed as a result of the firings of the culprit rule 172. From report 70 the analyzer 60 can determine during which recognition-act cycles, or match numbers, the culprit rule fired. This list of match numbers is used to select only those entries from report 66 which have corresponding match numbers 86. This results in a report selected from the entries of report 66 which gives the class name 88 of only those classes which were changed as a result of firings of the culprit rule.

Once a user has reviewed the results of the selection of step 172, he may move on to select the suspect rules, which are those having left-hand-sides affected by the firing of the culprit rule 174. This information is presented by extracting from report 68 only those entries having RHS fired information 98 matching the culprit rule. The names of the suspect rules are used as a filter for the remaining reports to the user 176–182. The list of suspect rules will be used to select only those entries from the various reports which correspond to those suspect rules.

After the suspect rules are selected, the user is presented with several reports 176–182 to assist him in determining the causes of execution inefficiencies. These reports need not be presented in any particular order, but preferably can be selected as desired by the user. For a given problem, some reports will usually supply more helpful information then others.

The user is presented with an inference cycle activity report 176, with only inference cycles including a suspect rule being included. This is obtained from report 70. The user is also presented with a report of tests and hits by pattern for suspect rules 178. This is obtained from report 72, and all patterns for each of the suspect rules are presented. A report of matches by pattern for the suspect rules 180 is extracted from report 74. Finally, the size of the conflict set by cycle is reported 182. This is extracted from the entries in report 70.

In many instances, the user will determine, based upon his experience and knowledge, that it is not necessary to view all of the reports just described. An anomaly may become evident early in the process, and the user may wish to repair this without checking further. For example, if a large number of LHSs are identified as affected in step 174, the user may wish to modify a class member or combine several similar rules into a single rule and resolve the differences on the right-hand-side of the combined rule. If changes are made at this point, the user would exit the analyzer 60 and perform another test run on the expert system.

The types of changes to be made to the expert system as a result of viewing the results of the reports described above will be understood by those skilled in the art, and will not be described here in detail. For exemplary purposes, a few uses of each report will be briefly described.

The inference cycle activity report provided in step 176 can be used to diagnose problems due to large conflict sets or identify anomalies in rule firings by looking for match cycles that significantly deviate from the norm. The report provided by step 178 can be used to evaluate trade-offs between LHS matches and procedural search, or to indicate that patterns within an LHS should be reordered to reduce excessive interelement tests. The report provided in step 180 can be used to diagnose large cross-product effects, or to raise an alert that dynamic storage explosion may be occurring.

Back flow lines 186, 188 indicate that the user, if desired, may step backwards through the analyzer 60 procedure in order to examine data regarding the performance of additional rules. For example, if desired, the user may move backward from step 172 to step 170. This would correspond to selecting additional culprit rules, with the additional culprit rules being all those other rules which also caused changes to the same classes which were changed by the original culprit rule.

In a similar manner, a back step may be made from step 174 to step 172 to generate additional changed classes. This would correspond to selecting all of the classes which could cause changes to the original set of suspect rules as well as those which were actually changed by the original culprit rule. A selection of new suspect rules would then be made which includes all suspect rules which are also changed by this enlarged set of classes. The various reports generated in steps 176–182 would then select all of the entries corresponding to this enlarged set of suspect rules.

As will be appreciated by those skilled in the art, the system described above provides a monitoring facility for extracting appropriate data during execution of a rule based expert system, and for assisting a user in analyzing that data to pinpoint rules or data which need to be modified in order to improve system performance. This greatly improves the efficiency of performance data analysis 36 as described in connection with FIG. 3, greatly decreasing the time needed to improve the execution efficiency of a given expert system.

While the invention has been particularly shown and described with reference to a preferred embodiment, it will be understood by those skilled in the art that various changes in form and detail may be made therein without departing from the spirit and scope of the invention.

I claim:

1. A system for monitoring the performance of a rule-base application having rules and a working memory containing elements, each rule therein having a left-hand-side and a right-hand-side, comprising:
    a timer for accumulating match time caused by executing rule right-hand-sides;
    a first counter for counting working memory operations performed for each class of elements in the working memory;
    a second counter for counting the number of times each condition test is performed, and separately counting the number of times each condition test is successful;
    a third counter for counting the number of working memory element combinations which satisfy a pattern each time that pattern is matched; and
    means for storing information generated by said counters and said timer into a database.

2. The system of claim 1, further comprising a second timer for accumulating execution time of the rule right-hand-sides.

3. The system of claim 1, further comprising means for generating reports indicative of the information stored in the database.

4. The system of claim 1, further comprising:
    means for selecting suspect rules for examination; and
    means for displaying information extracted from the database concerning the suspect rules.

5. The system of claim 4, wherein said selecting means comprises:
    a comparator for determining a culprit rule whose right-hand-side, upon execution, caused a relatively large amount of time to be spent in a matching cycles;
    a first selector for selecting working memory classes affected by execution of the culprit rule right-hand-side; and
    a second selector for selecting all rules having left-hand-sides affected by changes in the selected working memory classes, such selected rules defining the suspect rules.

6. A method for providing information on causes of performance inefficiencies of a rule-based expert system, comprising the steps of:
    accessing performance data about the expert system generated during operation of the expert system;
    processing the accessed performance data to determine a culprit rule which caused a relatively large amount of time to be consumed in matching cycles as a result of executing its right-hand-side;
    selecting working memory classes affected by execution of the culprit right-hand-side; and
    selecting as suspect rules all rules having left-hand-sides affected by changes in the selected working memory classes; and displaying performance data for the suspect rules.

7. A method for monitoring the performance of a rule-based application, comprising the steps of:
    accumulating match times caused by executing rule right-hand-sides;
    counting working memory operations performed for each class of elements in a working memory;
    counting how often each condition test in a rule left-hand-side is performed;
    counting how often each condition test is successfully performed;
    counting how many working memory elements satisfy a pattern in a rule left-hand-side when such pattern is matched; and
    storing information generated by such accumulating and counting steps into a database.

8. The method of claim 6, further comprising the step of accumulating execution times for rule right-hand-sides.

9. The method of claim 6, further comprising the steps of:
    accessing the database;
    selecting a set of suspect rules; and
    displaying performance data for the suspect rules.

10. The method of claim 8, wherein said selecting step comprises the steps of:
    processing the accessed performance data to determine a culprit rule which caused a relatively large amount of time to be consumed in matching cycles as a result of executing its right-hand-side;
    selecting working memory classes affected by execution of the culprit right-hand-side; and
    selecting as suspect rules all rules having left-hand-sides affected by changes in the selected working memory classes.

* * * * *